United States Patent [19]

Kammeraad

[11] 4,156,320
[45] May 29, 1979

[54] DOWNRIGGER

[75] Inventor: James A. Kammeraad, Holland, Mich.

[73] Assignee: DFK Inc., Holland, Mich.

[21] Appl. No.: 804,915

[22] Filed: Jun. 9, 1977

[51] Int. Cl.² ............................................. A01K 89/00
[52] U.S. Cl. ..................................... 43/27.4; 242/106
[58] Field of Search ................... 43/27.4, 21.2, 43.12; 242/106

[56] References Cited

U.S. PATENT DOCUMENTS

| 3,937,415 | 2/1976 | Prinz | 43/27.4 X |
| 4,050,180 | 9/1977 | King | 43/27.4 |

Primary Examiner—Robert C. Watson
Attorney, Agent, or Firm—Malcolm R. McKinnon

[57] ABSTRACT

An improved downrigger particularly adapted for use in downtrolling terminal fishing tackle at a selectable depth in the water, the improved downrigger including an improved base enabling the downrigger to be readily mounted on and removed from a boat, the base carrying a boom which may be easily indexed to any of four positions without requiring removal of the boom and associated mounting means therefor from the base. The downrigger also includes a cable reel and crank handle means that may be readily mounted for either right or left hand use, and, in addition, the downrigger includes means for indicating the depth or distance at which a trolling weight or terminal fishing tackle are being trolled in the water. In several embodiments of the invention, the boom may also be easily and quickly extended and retracted and improved means is provided for locking the boom in the extended and retracted positions.

16 Claims, 14 Drawing Figures

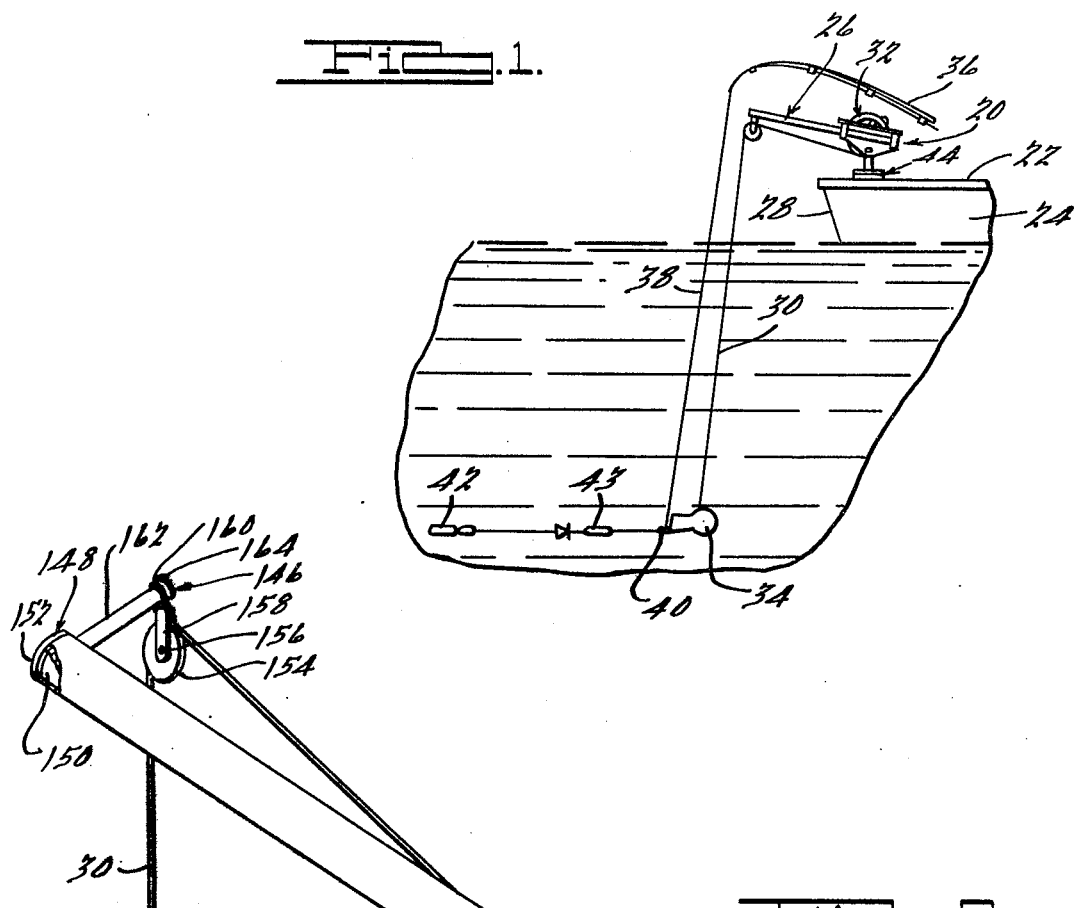
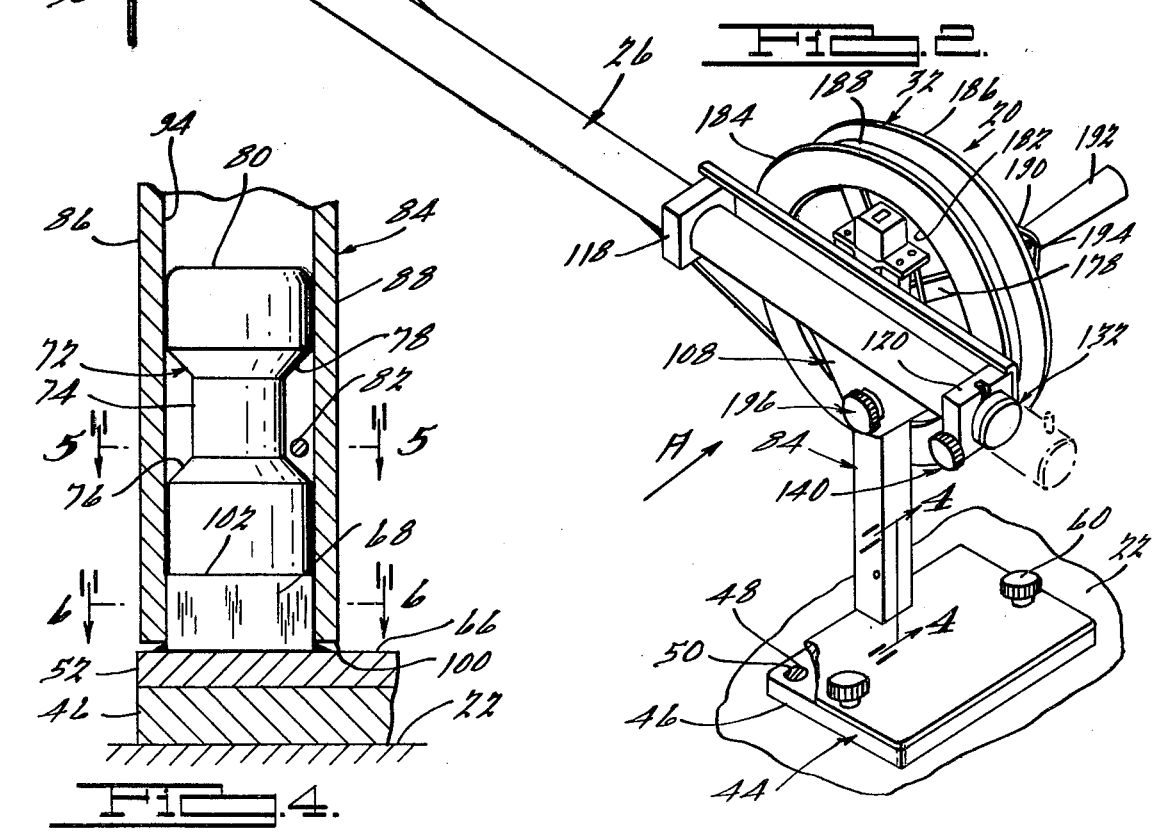

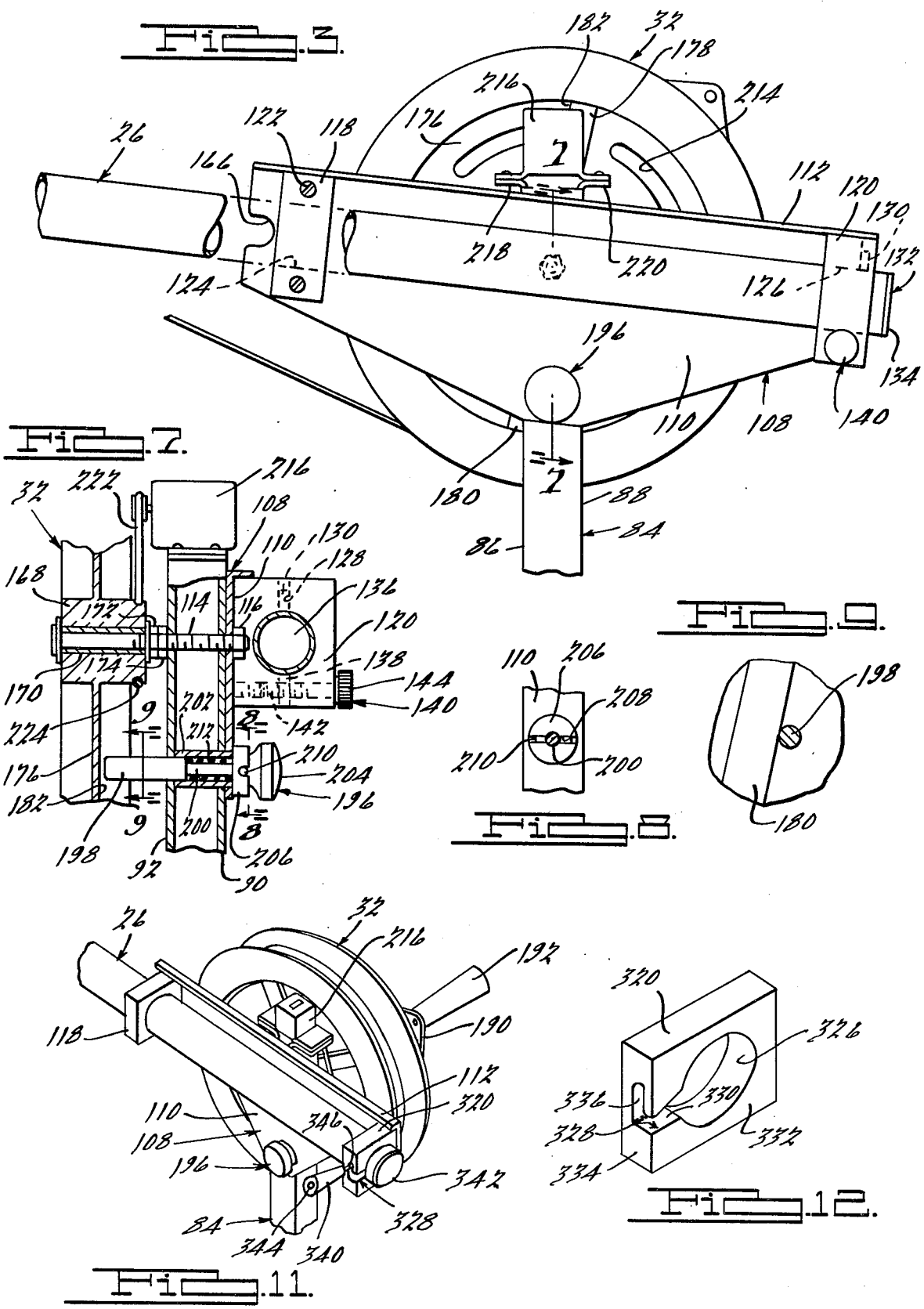

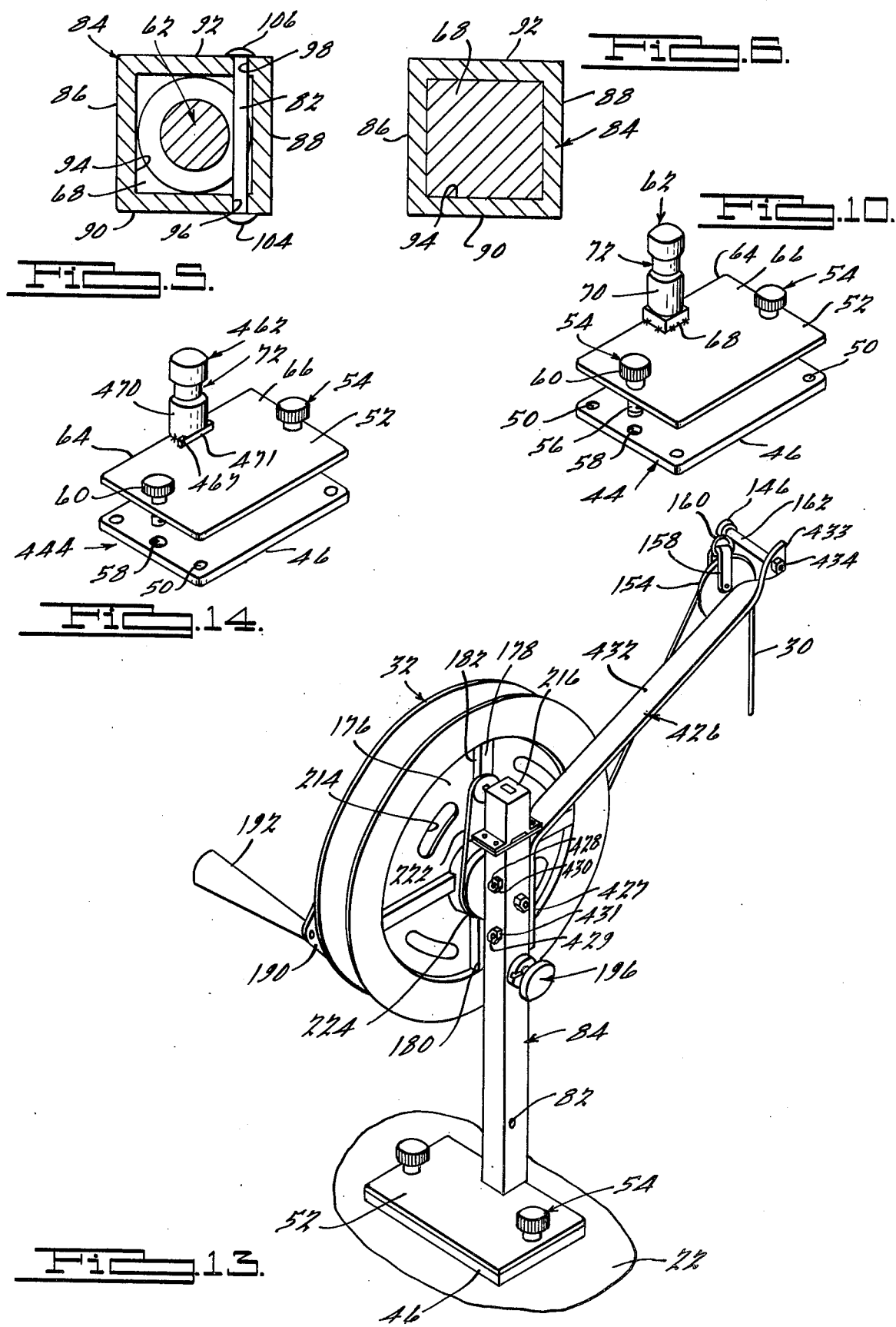

DOWNRIGGER

BRIEF SUMMARY OF THE INVENTION

This invention relates to downriggers and, more particularly, to an improved downrigger particularly adapted for use in fishing in the manner wherein a trolling weight is utilized to maintain terminal fishing tackle, including a lure or bait, at a desired depth in the water during trolling operations.

Heretofore, downriggers have been utilized in fishing for various species of game fish. In utilizing such downriggers, a fishing line leading from a fishing rod and reel is releasably attached to a trolling weight after which the trolling weight is lowered through the agency of a downrigger cable to the desired water depth and temperature where either fresh or saltwater species of game fish are likely to be located. The trolling weight functions to maintain the terminal fishing tackle including the lure or bait (which is attached to the fishing line) at the desired depth in the water during the trolling operation, and when a fish strikes the lure or bait, the fishing line is automatically released from the trolling weight through the agency of a conventional automatic line release thereby separating the fishing line from the trolling weight whereby the person fishing can play and land the fish with full rod and reel action and without the encumbrance of the trolling weight. However, prior downriggers of the indicated character have been subject to a number of deficiencies. For example, many prior downriggers cannot be readily mounted on and removed from a boat, and the booms that are provided on many prior downriggers for the purpose of extending the downrigger cable outboard of the transom or gunwales of the boat cannot be indexed without first removing the boom and associated support therefor from the base of the downrigger with the result that the downrigger may be lost overboard if an indexing operation of the boom is attempted under adverse conditions, as for example, in rough water or where severe wave action is encountered. Moreover, the booms of other prior downriggers cannot be conveniently extended over the transom or gunwales and secured in an extended position for trolling operations and thereafter conveniently retracted to an unobtrusive and secured position when the downriggers are not in use, as for example, during fueling operations at a fueling dock, with the result that such prior downriggers often inhibit maneuvering of the boat in close quarters. In addition, prior downriggers of the indicated character conventionally do not include means which enables the downrigger, including the cable reel and associated boom, to be easily removed from the deck of a boat and at the same time provide a substantially flush deck free of upstanding mounting posts or other obstacles. Still other prior downriggers require separate models to be provided for left hand and right hand use and cannot be easily converted for use by either right handed or left handed persons as the case may be.

An object of the present invention is to overcome the aforementioned as well as other disadvantages in prior downriggers of the indicated character and to provide an improved downrigger incorporating improved means which enables the downrigger to be easily and quickly mounted on the deck of a boat or other watercraft and easily and quickly removed from the deck while at the same time maintaining a substantially flush deck free of upstanding mounting posts or other obstacles, thereby increasing the safety of persons traversing the deck and facilitating easy storage and safekeeping of the downrigger when the downrigger is not in use.

Another object of the invention is to provide an improved downrigger having a boom which may be conveniently and securely extended over the transom or gunwales of a boat and which may be easily and quickly retracted inboard and secured in an unobtrusive position when not in use.

Another object of the invention is to provide an improved downrigger having a boom that may be readily indexed without first removing the boom and associated mounting means from the base of the downrigger thereby minimizing the possibility of loss of the downrigger overboard when the boom is indexed under adverse conditions.

Another object of the invention is to provide an improved downrigger having an extensible boom which may, if desired, be used as an outrigger for trolling the top of the water, and which may be extended and utilized for both top trolling and downtrolling in rough water or where severe wave action is encountered without damage to the downrigger or to the deck, transom, gunwales or other components of the boat on which the downrigger is mounted.

Another object of the invention is to provide an improved downrigger which may be easily and quickly adapted for either left hand or right hand manual operation thereby eliminating the necessity of providing left hand and right hand models.

Still another object of the invention is to provide an improved, durable, efficient and reliable downrigger that may be economically manufactured, assembled and installed with a minimum of time, labor and expense.

The above as well as other objects and advantages of the present invention will become apparent from the following description, the appended claims and the accompanying drawings.

BRIEF DESCRIPTION OF THE DRAWINGS

FIG. 1 is a side elevational view of a downrigger embodying the present invention, showing the same mounted on the stern section of a boat and also illustrating the manner in which the downrigger is utilized in conjunction with a fishing rod, fishing line, trolling weight and associated quick release mechanism and terminal fishing tackle;

FIG. 2 is an enlarged perspective view of the downrigger illustrated in FIG. 1;

FIG. 3 is an enlarged side elevational view of a portion of the structure illustrated in FIG. 2 and looking in the direction of the arrow "A" in FIG. 2;

FIG. 4 is a cross sectional view of a portion of the structure illustrated in FIG. 2, taken on the line 4—4 thereof;

FIG. 5 is a cross sectional view of a portion of the structure illustrated in FIG. 4, taken on the line 5—5 thereof;

FIG. 6 is a cross sectional view of a portion of the structure illustrated in FIG. 4, taken on the line 6—6 thereof;

FIG. 7 is a cross sectional view of a portion of the structure illustrated in FIG. 3, taken on the line 7—7 thereof;

FIG. 8 is a cross sectional view of a portion of the structure illustrated in FIG. 7, taken on the line 8—8 thereof;

FIG. 9 is a cross sectional view of a portion of the structure illustrated in FIG. 7, taken on the line 9—9 thereof;

FIG. 10 is an exploded view of the base portion of the downrigger illustrated in FIG. 2, showing the same removed from the other components of such downrigger;

FIG. 11 is a fragmentary perspective view of a downrigger and illustrating another embodiment of the invention;

FIG. 12 is a perspective view of a portion of the boom locking means incorporated in the structure illustrated in FIG. 11, showing the same removed from the other components of such structure;

FIG. 13 is a perspective view of a downrigger and illustrating still another embodiment of the invention; and FIG. 14 is an exploded perspective view of the base portion of the downrigger illustrated in FIG. 13, showing the same removed from the other components of such downrigger.

DETAILED DESCRIPTION

Referring to the drawings, and more particularly to FIG. 1 thereof, a downrigger, generally designated 20, embodying the present invention is illustrated therein, the downrigger 20 being shown mounted on the deck 22 of the stern section of a boat 24 whereby the extensible boom, generally designated 26, of the downrigger 20 projects rearwardly over the transom 28 of the boat 24. As shown in FIG. 1, the downrigger 20 includes a cable 30 which may of any desired length and strength, as for example, approximately 200 feet in length with a tensile strength of approximately 135 pounds. The cable may be fabricated of any desired or conventional material, such as stainless steel, and the cable is wound on a reel, generally designated 32, the free end of the cable being secured to a conventional trolling weight 34 by any desired or conventional means such as a snap swivel. As will be described hereinafter in greater detail, the downrigger 20 is adapted to be used in conjunction with a conventional fishing rod and reel 36 having a fishing line 38 which, during trolling operations, is releasably secured to the trolling weight 34 through the agency of a conventional quick release mechanism 40 which may be of any desired or conventional type and which will automatically release the fishing line 38 from the trolling weight 34 when a fish strikes a conventional lure or bait, such as 42, which may be included in the terminal fishing tackle secured to the terminal end portion of the fishing line 38 in a conventional manner, the terminal fishing tackle also often including a dodger, such as 43, usually disposed forwardly of the lure or bait 42. As previously mentioned, the trolling weight 34 functions to maintain the terminal fishing tackle including the lure or bait at the desired depth during trolling operations and when a fish strikes the lure or bait, the fishing line is thus automatically released from the trolling weight thereby separating the fishing line from the trolling weight so that a person fishing can play and land the fish with full rod and reel action without the encumbrance of the trolling weight 34, which, of course, remains attached to the cable 30 after the fishing line 38 is automatically released so that the trolling weight may be retrieved for subsequent reuse by winding the cable 30 onto the reel 32.

The downrigger 20 may be constructed of any desired or conventional materials having sufficient strength to withstand the forces exerted thereon and, in this embodiment of the invention, is comprised of a generally rectangular, substantially flat base, generally designated 44, the base 44 including a stationary base plate 46 which is adapted to be secured to the deck 22 of the boat 24 through the agency of through bolts, such as 48, which project through holes 50 provided in the four corner portions of the base plate 46 as shown in FIGS. 2 and 10. The base 44 also includes a removable base plate 52 which is adapted to overlie the base plate 46 and be releasably secured thereto through the agency of a pair of releasable, bolt-type locking members, generally designated 54, each having an externally threaded shank portion 56 which is adapted to pass through the plate 52 and threadably engage an associated internally threaded opening 58 provided in the stationary base plate 46. As shown in FIGS. 2 and 10, the outer end of the threaded shank portion of each of the locking members 54 carries a knob 60 which facilitates manual rotation of the locking member and also functions to clamp the base plate 52 to the base plate 46 when the shank portion 56 is screwed into the stationary base plate as illustrated in FIG. 2.

In accordance with the present invention, a stanchion, generally designated 62, is provided which is disposed centrally of the base plate 52 at a position adjacent the edge 64 thereof, the stanchion 62 being permanently fixed to the base plate 52, as by welding, and projecting upwardly from the upper surface 66 thereof. As shown in FIGS. 4, 5, 6 and 10, in this embodiment of the invention, the lower end portion 68 of the stanchion 62 is noncircular and substantially square in transverse cross section while the main body portion 70 of the stanchion is circular in transverse cross section, the maximum diameter of the main body portion 70 of the stanchion being substantially the same as the length of one side of the square lower end portion 68. The main body portion 70 of the stanchion is reduced in diameter so as to define a groove 72 having a vertical inner wall 74 and outwardly sloping side walls 76 and 78, the groove 72 being spaced from the upper end 80 of the stanchion. The height of the inner wall 74 defining the bottom of the groove and measured axially of the stanchion is greater than the height of the lower end portion 68 of the stanchion, measured axially of the stanchion, and the groove is adapted to receive a locking pin 82 as will be described hereinafter in greater detail.

The downrigger 20 also includes an upstanding tubular mounting member 84 which carries the extensible boom 26 and the cable reel 32, the tubular mounting member 84 being in the form of a box beam having upstanding, spaced front and rear walls 86 and 88 joined by integral upstanding side walls 90 and 92 and defining an internal passageway 94 that is substantially square in cross section and adapted to receive the square lower end portion 68 of the stanchion 62 with an easy sliding fit. With such a construction, the tubular mounting member 84 may be mounted on the stanchion 62 in four positions angularly spaced at ninety degrees to facilitate side as well as stern trolling and also permitting the boom 26 to be placed in a forwardly projecting, generally unobtrusive position inboard of the gunwales, if so desired, when the downrigger is not in use. The side walls 90 and 92 of the tubular mounting member are provided with a pair of aligned holes 96 and 98 located in a position such that the locking pin 82 may be passed through such holes and through the groove 72 so as to be disposed adjacent the sloping wall 76 defining the lower edge of the groove when the tubular mounting member 84 is mounted on the stanchion 62 in the position illustrated in FIGS. 2 and 4 whereby the lower edge 100 of the tubular mounting member is disposed adjacent the upper surface 66 of the removable base plate 52 as illustrated in FIG. 4. With such a construction, since the height of the wall 74 defining the bottom of the groove 72 is greater than the height of the square lower end portion 68 of the stanchion, the tubular mounting member 84 may be manually lifted to a position such that the lower edge 100 of the tubular mounting member is above the upper edge 102 of the square lower end portion of the stanchion after which the tubular mounting member may be rotated or indexed about the longitudinal axis of the cylindrical body portion of the stanchion to index the boom to any of the four angularly disposed positions previously described. The pin 82 however prevents complete removal of the tubular mounting member from the stanchion by moving into abutting relationship with the sloping wall 78 defining the upper side of the groove 72 with the result that after the lower edge 100 of the tubular mounting member clears the upper edge 102 of the square bottom portion of the stanchion to permit rotation of the tubular mounting member relative to the stanchion, further upward longitudinal movement of the tubular mounting member relative to the stanchion is prevented when the pin 82 engages the upper wall 78 of the groove thereby preventing complete removal of the tubular mounting member from the stanchion and minimizing the possibility of loss of the downrigger overboard when the tubular mounting member and the boom carried thereby are indexed. After the tubular mounting member has been indexed to the desired angular position, the tubular mounting member may be lowered onto the square lower end portion 68 of the stanchion so as to prevent rotation of the tubular mounting member relative to the stanchion. The pin 82 is preferably in the form of a rivet having heads such as 104 and 106, although it will be understood that the pin 82 may be made in the form of a removable pin if such a construction is desired.

In this embodiment of the invention, the upper end portion of the tubular mounting member 84 carries a support member, generally designated 108, having a substantially flat vertically disposed body portion 110 and an integral outwardly projecting flange portion 112 which functions to strengthen the support member 108. As shown in FIGS. 3 and 7, the support member 108 is secured to the upper end portion of the tubular mounting member 84 through the agency of an elongate bolt 114 which projects horizontally through the side walls 90 and 92 of the tubular mounting member and through the body portion 110 of the support member 108, the bolt 114 being retained by a nut 116. In this embodiment of the invention, a pair of bearing blocks 118 and 120 are provided for the purpose of slidably supporting the extensible boom 26, the boom 26 being formed, for example, of cylindrical aluminum tubing that is circular in cross section and of any desired length, such as, for example, four feet in length. The bearing blocks 118 and 120 are secured to the opposite end portions of the body portion 110 of the support member 108, as by screws 122, and the bearing blocks 118 and 120 define centrally disposed circular passageways 124 and 126, respectively, adapted to receive the boom 26 with an easy sliding fit, the passageways 124 and 126 being disposed in axially aligned relationship whereby the longitudinal axis of the boom 26 projects angularly upwardly as illustrated in FIGS. 1, 2 and 3. In this embodiment of the invention, the bearing block 120 is provided with a vertical slot 128 adapted to receive an upwardly projecting pin 130 carried by the inner or normally inboard end portion of the boom 26 to prevent the boom 26 from rotating about its longitudinal axis when the boom is in its fully extended position as illustrated in FIGS. 1, 2 and 3. The pin 130 projects through the relatively thin wall of the boom and is anchored in an end plug 132 having an end cap portion 134 and a reduced diameter body portion 136 projecting into the boom. In this embodiment of the invention, the lower portion of the bearing block 120 is slotted, as at 138, and a transversely extending locking bolt 140 is provided having an externally threaded shank portion 142 which threadably engages the block 120 and which may be manually tightened through the agency of a knob 144 to releasably clamp and frictionally lock the boom 26 in any longitudinally adjusted position including the fully extended position, any intermediate position and the fully retracted position.

The outer or normally outboard end portion of the boom 26 carries a transversely projecting pulley support bolt 146 one end of which passes through the wall of the boom and threadably engages an end plug 148 having a reduced diameter portion 150 projecting into the boom and a cap portion 152 overlying the outer end of the boom. The outer end of the pulley support bolt 146 carries a conventional pulley 154 mounted for rotation on a pin 156 carried by a generally U-shaped pulley support 158 which is secured to the pulley support bolt through the agency of a generally figure-8 shaped link 160. The pulley 154 is preferably formed of nylon and the cable 30 is trained over the pulley, the pulley being disposed in outwardly spaced relationship with respect to the boom whereby the pulley and the cable 30 are maintained in general alignment with the cable reel 32. In order to maintain the pulley and cable in spaced relationship with respect to the boom, a spacer sleeve 162 is provided which is circumposed on the bolt 146 whereby the link 160 is retained between the outer end of the spacer sleeve and the head 164 of the pulley support bolt 146. If desired, an open ended slot, such as 166, may be provided in the ends of the body portion 110 of the support member 108 whereby the spacer sleeve 162 may be inserted in the slot 166 to prevent the boom 26 from rotating when the boom is in the fully retracted position and thereby prevent inadvertent fouling of the cable 30 by maintaining the pulley 154 in alignment with the reel when the boom is in the retracted position.

The reel 32 is mounted for rotation on the tubular mounting member 84, the reel 32 including a hub portion 168 having a sleeve bearing 170 therein which is mounted for rotation on the shank portion of the bolt 114, suitable spacer nuts, such as 172 and 174, being provided between the inner end of the hub portion 168 of the reel and the side wall 92 of the tubular mounting member to maintain the reel 32 in spaced relationship with respect to the tubular mounting member. The central portion 176 of the reel 32 is of generally disc like configuration and extends radially outwardly from the hub portion 168 of the reel. The central portion 176 of the reel is provided with four integral equally angularly spaced, radially extending spokes, such as 178 and 180 and defining recesses such as 182 therebetween. The reel 32 also includes spaced peripheral flange portions 184 and 186 defining a groove 188 adapted to receive the cable 30. A radially outwardly projecting tab 190 is fixed to the flange portion 186 of the reel by any suitable means, and a crank handle 192 is secured to the tab 190 by means of a bolt 194 so that the reel 32 can be manually rotated. Means is also provided for releasably locking the reel 32, such means being comprised of a locking member 196 having an enlarged inner end portion 198, a reduced diameter central portion 200 disposed within a retainer 202, and a knob 204. The retainer 202 is fixed to the tubular mounting member as by a set screw (not shown) and the retainer terminates in an enlarged collar portion 206. Such collar portion is provided with a transverse groove 208 in the end wall thereof adapted to receive a cross pin 210 extending through the central portion 200 of the locking member. A compression spring 212 is also provided, one end of which bears against the inner end of the enlarged portion 198 of the locking member while the opposite end of the spring bears against the inner surface of the enlarged collar portion 206. As shown in FIG. 7, when the cross pin 210 is disposed in the groove 208, the enlarged inner end portion 198 of the locking member is disposed in one of the recesses 182 defined by the reel and such inner end portion of the locking member is adapted to bear against the side of an adjacent spoke to prevent rotation of the reel. However, when the knob 204 is manually pulled outwardly against the action of the spring 212 and rotated so that the pin 210 is moved out of the groove 208 and instead bears against the outer surface of the end of the collar 206, the inner end portion 198 of the locking member moves clear of the spokes, such as 178 and 180, and the reel is then free to rotate about the longitudinal axis of the bearing 170.

It will be noted that the reduced diameter portion 200 of the locking member passes through both the side wall 90 of the tubular mounting member and through the body portion 110 of the support member 108 thereby assisting in holding the support member on the tubular mounting member and preventing the support member from rotating about the longitudinal axis of the bolt 114. If desired, enlarged openings, such as 214, may be provided in the central portion of the reel to reduce the weight thereof. However, the locking member is not intended to and does not enter the openings 214, the locking action being effected when the enlarged inner end portion 198 of the locking member bears against one of the spokes, such as 178 or 180, as previously described, it being understood that the weight of the cable 30 and the trolling weight 34 will tend to hold a spoke against the locking member when the locking member is in the locked position as previously described. Consequently, it is not necessary for a user of the downrigger to align the locking member with an opening in the reel to lock the reel. From the foregoing, it will also be appreciated that by simply inverting the support member, the support member and reel may be mounted on the opposite side of the tubular mounting member from that illustrated whereby the crank handle may be disposed on either the right side or the left side of the tubular mounting member for either right hand or left hand manual operation thereby eliminating the necessity of providing right hand and left hand models of the downrigger.

The downrigger 20 is also provided with a conventional cable depth counter 216 which is mounted on outwardly projecting flanges 218 and 220 formed integrally with the upper portions of the front and rear walls 86 and 88 of the tubular mounting member, the counter 216 being driven by a belt 222 entrained on a pulley 224 formed integrally with the hub portion 168 of the reel. With such a construction, the counter indicia is readily visible to a user of the downrigger whereby such user is readily apprised of the length of the cable that has been unwound from the reel 32 during trolling operations.

Another embodiment of the invention is illustrated in FIGS. 11 and 12 of the drawings. This embodiment of the invention includes the boom 26, reel 32, base 44, tubular mounting member 84, support member 108, bearing block 118 and counter 216 all as previously described. However, in this embodiment of the invention, a bearing block 320 is provided which is substituted for the bearing block 120 previously described. In this embodiment of the invention, the bearing block 320 defines a centrally disposed circular passageway 326 adapted to receive the boom 26 with an easy sliding fit, the passageway 326 being disposed in axially aligned relationship with respect to the passageway 124 in the bearing block 118 whereby the longitudinal axis of the boom projects angularly upwardly as illustrated in FIG. 11. The bearing block 320 also defines a generally "L" shaped groove, generally designated 328 having a horizontally extending leg 330 which communicates with the passageway 326 and which is open at the rear face 332 and at the side face 334 of the bearing block 320. The generally "L" shaped groove 328 also includes a vertically extending leg portion 336 which communicates with the horizontally extending leg portion 330, the vertically extending leg portion 336 also being open at the side face 334 of the bearing block and communicating with the passageway 326. In this embodiment of the invention, a handle 340 is provided which is disposed at a position near, but spaced from, the end plug 342, the handle 340 being secured by a bolt 344 threadably engaging a reduced diameter portion of the end plug 342 disposed within the boom 26 in the manner in which the reduced diameter portion 136 of the end plug 132 is disposed within the end portion of the boom 26. A sleeve 346 is circumposed on the shank portion of the bolt 344 at a position between the inner end of the handle 340 and the boom 26. The sleeve 346 is adapted to be initially inserted in the horizontally extending leg portion 330 of the groove 328 when the boom is in the forwardly extended position after which the boom and handle 340 are rotated in a clockwise direction, as viewed in FIG. 11, about the longitudinal axis of the boom whereby the sleeve 346 moves upwardly into the vertically extending leg portion 336 of the groove 328 and engages the walls of the block defining such vertical leg portion so as to releasably lock the boom in the forwardly extended position. When it is desired to retract the boom 26, such operation may be readily accomplished by moving the handle 340 downwardly until the sleeve 346 is in alignment with the horizontally extending leg portion 330 of the groove 328 after which the boom may be manually retracted in a rearward direction by withdrawing the sleeve 346 out of the horizontally extending leg portion 330 and past the rear face 332 of the bearing block 320.

Another embodiment of the invention is illustrated in FIGS. 13 and 14 of the drawings. This embodiment of the invention includes the cable reel 32, tubular mounting member 84, reel locking member 196 and cable depth counter 216 all as previously described. However, in this embodiment of the invention a modified base 444 is provided, the modified base 444 including the stationary base plate 46 and removable base plate 52 with associated locking members 54 as previously described. However, in this embodiment of the invention, a stanchion generally designated 462, is provided which is disposed centrally of the base plate 52 at a position adjacent the edge 64 thereof, the stanchion 462 being permanently fixed to the base plate 52, as by welding, and projecting upwardly from the upper surface 66 of the base plate 52. As shown in FIG. 14, in this embodiment of the invention, instead of forming the entire lower end portion of the stanchion 462 in a noncircular and substantially square configuration as in the embodiment of the invention illustrated in FIG. 10, a notch 467 is formed in one side of the lower end portion of the body 470 of the stanchion, the body 470 of the stanchion being circular in transverse cross section and of the same diameter as the main body portion 70 of the stanchion 62. A substantially rectangular plate 471 is inserted in the notch 467 whereby the outer surface of the plate at the center thereof is tangent to the right circular cylinder defined by the main body portion 470 of the stanchion 462 and such outer surface is disposed in a plane parallel to the edge 64 of the plate 52. The length of the plate 471 measured in a direction parallel to the edge 64 of the plate is substantially the same as the maximum diameter of the main body portion 470 of the stanchion and the height of the plate 471 is substantially the same as the height of the square lower end portion 68 of the stanchion 62. The main body portion 470 of the stanchion 462 is also reduced in diameter so as to define the groove 72 the height of the inner wall 74 of which is greater than the height of the plate 471, measured axially of the stanchion, whereby the groove is adapted to receive the locking pin 82 to limit the vertical movement of the tubular mounting member 84 in the manner previously described. This embodiment of the invention reduces the cost of manufacturing the base since less material and machining are required to form the stanchion 462 than are required to form the stanchion 62. However, the base 444 operates in the same manner and produces the same results as the base 44 previously described.

In this embodiment of the invention the extensible boom 26 and the support member 108 and associated bearing blocks are also eliminated, and a fixed boom 426 is provided in place of the extensible boom 26. The fixed boom 426 is relatively short as compared with the extensible boom 26, and the fixed boom 426 may extend, for example, approximately one foot from the tubular mounting member 84. The fixed boom 426 includes a vertically extending portion 427 which is fixed to the front wall 86 of the tubular mounting member 84 by any suitable means, as for example, by bolts 428 and 429 secured by nuts 430 and 431. The boom 426 also includes an integral forwardly and angularly upwardly extending central portion 432 and the free end 433 of the boom is twisted whereby the free end 433 is disposed in a vertical plane normal to the plane of the central portion 432 of the boom. The pulley support bolt 146 is fixed by a nut 434 to the free end portion 433 of the boom 426 so that the pulley 154 is disposed in substantial alignment with the reel 32 in the manner previously described.

While preferred embodiments of the invention have been illustrated and described, it will be understood that various changes and modifications may be made without departing from the spirit of the invention.

What is claimed is:

1. A downrigger comprising, in combination, a base, a stanchion fixed to said base and projecting upwardly therefrom, one end portion of said stanchion adjacent said base being noncircular in transverse cross section, the remaining portions of said stanchion being circular in transverse cross section, a tubular mounting member defining an internal passageway noncircular in transverse cross section and adapted to receive said one end portion of said stanchion to prevent relative angular movement therebetween, means permitting limited longitudinal movement of said mounting member relative to said stanchion whereby said mounting member may be angularly indexed relative to said stanchion, a boom carried by said mounting member and projecting outwardly therefrom, a cable reel mounted for rotation on said mounting member, and means for releasably locking said reel in a selected angular position.

2. The combination as set forth in claim 1 wherein said boom is mounted for sliding movement relative to said tubular mounting member.

3. The combination as set forth in claim 1 wherein said base includes a stationary base plate adapted to be secured to a water craft and a removable base plate overlying said stationary base plate, said stanchion being fixed to said removable base plate and projecting upwardly therefrom, and means releasably securing said removable base plate to said stationary base plate.

4. The combination as set forth in claim 1 including a cable wound on said reel, and means mounted on the upper end of said mounting member and driven by said reel and effective to indicate the amount of cable unwound from said reel.

5. The combination as set forth in claim 1 wherein said one end portion of said stanchion is square in transverse cross section.

6. A downrigger, comprising, in combination, a base adapted to be secured to a water craft, a stanchion fixed to said base and projecting upwardly therefrom, a tubular mounting member defining an internal passageway adapted to be received on said stanchion, a support member secured to said mounting member, bearing means carried by said support member, an elongate extensible boom mounted for sliding movement in said bearing means, means for locking said boom in a selected longitudinal position, a cable reel mounted for rotation on said mounting member, means for releasably locking said reel in a selected angular position, and pulley support means projecting outwardly from said boom, said support member defining a recess adapted to receive said pulley support means when said boom is in a retracted position to limit rotational movement of said boom in said retracted position.

7. A downrigger comprising, in combination, a base, said base including a stationary base plate adapted to be secured to a water craft and a removable base plate overlying said stationary base plate, means releasably securing said removable base plate to said stationary base plate, a stanchion fixed to said removable base plate and projecting upwardly therefrom, one end portion of said stanchion adjacent said removable base plate being noncircular in transverse cross section, the remaining portions of said stanchion being circular in transverse cross section, a tubular mounting member defining an internal passageway noncircular in transverse cross section and adapted to receive said one end portion of said stanchion to prevent relative angular movement therebetween, means permitting limited longitudinal movement of said mounting member relative to said stanchion whereby said mounting member may be angularly indexed relative to said stanchion, a support member secured to said mounting member, bearing means carried by said support member, an elongate extensible boom mounted for sliding movement in said bearing means, means for locking said boom in a selected longitudinal position, a cable reel mounted for rotation on said mounting member, and means for releasably locking said reel in a selected angular position.

8. The combination as set forth in claim 7 including a cable wound on said reel, and means mounted on the upper end of said mounting member and driven by said reel and effective to indicate the amount of cable unwound from said reel.

9. The combination as set forth in claim 7 including pulley support means projecting outwardly from said boom, said support member defining a recess adapted to receive said pulley support means when said boom is in a retracted position to limit rotation movement of said boom in said retracted position.

10. The combination as set forth in claim 7 wherein said one end portion of said stanchion is square in transverse cross section.

11. A downrigger comprising, in combination, a base, a stanchion fixed to said base and projecting upwardly therefrom, one end portion of said stanchion adjacent said base being noncircular in transverse cross section, the remaining portions of said stanchion being circular in transverse cross section, said remaining portions of said stanchion defining a groove having an inner wall and spaced side walls, said groove being spaced from the upper end of said stanchion and being disposed above said one end portion of said stanchion, the height of said inner wall measured axially of said stanchion being greater than the height of said one end portion of said stanchion measured axially of said stanchion, a tubular mounting member defining an internal passageway noncircular in transverse cross section and adapted to receive said one end portion of said stanchion to prevent relative angular movement therebetween, pin means carried by said tubular mounting member and extending through the groove defined by said stanchion and permitting limited longitudinal movement of said mounting member relative to said stanchion whereby said mounting member may be moved above said one end portion of said stantion and angularly indexed relative to said stanchion, a support member secured to said mounting member, a pair of spaced bearing blocks secured to said support member, said bearing blocks defining aligned passageways, an elongate extensible boom mounted for sliding movement in the passageways defined by said bearing blocks, one of said bearing blocks defining a slot, means secured to one end portion of said boom and adapted to be received in the slot defined by said one bearing block to prevent rotational movement of said boom relative to said bearing block, a rotatable cable reel carried by said mounting member, and means for releasably locking said cable reel in a selected angular position.

12. The combination as set forth in claim 11 wherein said base includes a stationary base plate adapted to be secured to a water craft and a removable base plate overlying said stationary base plate, said stanchion being fixed to said removable base plate, and means releasably securing said removable base plate to said stationary base plate.

13. The combination as set forth in claim 11 wherein said one bearing block includes clamping means operable to lock said boom in a selected longitudinal position.

14. The combination as set forth in claim 11 wherein the maximum diameter of said remaining portion of said stanchion is substantially the same as the length of one side of said noncircular end portion of said stanchion.

15. A downrigger, comprising, in combination, a base, said base including a stationary base plate adapted to be secured to a water craft and a removable base plate overlying said stationary base plate, means releasably securing said removable base plate to said stationary base plate, a stanchion fixed to said removable base plate and projecting upwardly therefrom, one end portion of said stanchion adjacent said removable base plate being noncircular in transverse cross section, the remaining portions of said stanchion being circular in transverse cross section, said remaining portions of said stanchion defining a groove having an inner wall and outwardly sloping side walls, said groove being spaced from the upper end of said stanchion and being disposed above said one end portion of said stanchion, the height of said inner wall measured axially of said stanchion being greater than the height of said one end portion of said stanchion measured axially of said stanchion, a tubular mounting member defining an internal passageway noncircular in transverse cross section and adapted to receive said one end portion of said stanchion to prevent relative angular movement therebetween, pin means carried by said tubular mounting member and extending through the groove defined by said stanchion and permitting limited longitudinal movement of said mounting member relative to said stanchion whereby said mounting member may be moved above said one end portion of said stanchion and angularly indexed relative to said stanchion, a support member secured to said mounting member, a pair of spaced bearing blocks secured to said support member, said bearing blocks defining aligned passageways, an elongate extensible boom mounted for sliding movement in the passageways defined by said bearing blocks, a rotatable cable reel carried by said mounting member, means for releasably locking said cable reel in a selected angular position, a cable wound on said reel, and means mounted on the upper end of said mounting member and driven by said reel and effective to indicate the amount of cable unwound from said reel.

16. The combination as set forth in claim 15, one of said bearing blocks defining a slot, pin means secured to one end portion of said boom and adapted to be received in the slot defined by said one bearing block to prevent rotational movement of said boom relative to said bearing block, said one bearing block also including clamping means operable to lock said boom in a selected longitudinal position.

* * * * *